US011307598B2

(12) United States Patent
Aldarwish

(10) Patent No.: US 11,307,598 B2
(45) Date of Patent: Apr. 19, 2022

(54) AUTONOMOUS AIRCRAFT CONTROL SYSTEMS AND RELATED METHODS

(71) Applicant: Ahmad Fareed Aldarwish, Dubai (AE)

(72) Inventor: Ahmad Fareed Aldarwish, Dubai (AE)

(73) Assignee: Ahmad Fareed AlDarwish, Dubai (AE)

( * ) Notice: Subject to any disclaimer, the term of this patent is extended or adjusted under 35 U.S.C. 154(b) by 253 days.

(21) Appl. No.: 16/519,953

(22) Filed: Jul. 23, 2019

(65) Prior Publication Data
US 2020/0033892 A1    Jan. 30, 2020

Related U.S. Application Data

(60) Provisional application No. 62/711,305, filed on Jul. 27, 2018.

(51) Int. Cl.
*G05D 1/10* (2006.01)
*B64D 47/08* (2006.01)
(Continued)

(52) U.S. Cl.
CPC ............. *G05D 1/104* (2013.01); *B64C 39/02* (2013.01); *B64D 45/08* (2013.01); *B64D 47/08* (2013.01);
(Continued)

(58) Field of Classification Search
CPC .......... B64C 2201/12; B64C 2201/122; B64C 2201/143; B64C 39/02; B64C 39/024;
(Continued)

(56) References Cited

U.S. PATENT DOCUMENTS

| 4,586,049 A | 4/1986 | Davidson |
| 5,845,874 A | 12/1998 | Beasley |

(Continued)

FOREIGN PATENT DOCUMENTS

| CN | 106530839 A | 3/2017 |
| CN | 108052781 A | 5/2018 |
| DE | 102016103704 A1 | 9/2017 |

OTHER PUBLICATIONS

Abramowski, Tomasz, Numerical Investigation of Airfoil in Ground Proximity, Journal of Theoretical and Applied Mechanics, Vo. 45, No. 2, (2007), pp. 425-436.

(Continued)

*Primary Examiner* — Tyler J Lee
(74) *Attorney, Agent, or Firm* — TraskBritt

(57) ABSTRACT

An aircraft assistance method for reducing drag on the aircraft. The method includes flying an autonomous aircraft near the aircraft. An optimal position where vortices created by the autonomous aircraft or the aircraft interact with the other aircraft and/or autonomous aircraft to reduce drag and/or increase lift on the aircraft is determined. The autonomous aircraft is positioned in the optimal position. The method may include a landing assistance system with at least one autonomous aircraft configured to provide the aircraft with information regarding a desired position relative to a runway. The at least one autonomous aircraft may be configured to communicate with the aircraft through a processor and/or a display in the aircraft. The autonomous aircraft may be subject to a drone control system for a plurality of drones configured to position the plurality of drones in a formation.

12 Claims, 6 Drawing Sheets

(51) Int. Cl.
*B64C 39/02* (2006.01)
*B64D 45/08* (2006.01)
*G01S 1/08* (2006.01)

(52) U.S. Cl.
CPC .. *B64C 2201/122* (2013.01); *B64C 2201/143* (2013.01); *G01S 1/08* (2013.01)

(58) Field of Classification Search
CPC ........ B64D 45/04; B64D 45/08; B64D 47/08; G01S 1/08; G01S 19/48; G05D 1/104
See application file for complete search history.

(56) References Cited

U.S. PATENT DOCUMENTS

| | | | |
|---|---|---|---|
| 6,963,291 | B2 | 11/2005 | Holforty et al. |
| 8,949,090 | B2 | 2/2015 | Whitehead et al. |
| 9,758,257 | B1* | 9/2017 | Frolov .................. B64D 43/02 |
| 9,870,005 | B2* | 1/2018 | Frolov .................. B64C 13/16 |
| 2004/0000619 | A1* | 1/2004 | Barriety .................. B64C 3/52 244/219 |
| 2014/0214243 | A1 | 7/2014 | Whitehead et al. |
| 2017/0131726 | A1* | 5/2017 | Speyer .................. G05D 1/104 |
| 2017/0158327 | A1* | 6/2017 | Willford ................ B64D 17/80 |
| 2017/0267371 | A1* | 9/2017 | Frolov .................... G01F 1/68 |
| 2017/0269612 | A1* | 9/2017 | Frolov .................... G01F 1/46 |
| 2018/0297693 | A1* | 10/2018 | Liu .......................... B64C 3/10 |
| 2019/0004544 | A1* | 1/2019 | Feldmann ............. B64C 39/024 |
| 2019/0011934 | A1* | 1/2019 | DeBitetto ............. G05D 1/106 |
| 2019/0041874 | A1 | 2/2019 | Robin et al. |

OTHER PUBLICATIONS

Burnside, Joseph E., Using Ground Effect, Features Oct. 2015 Issue, 5 pages.
DJI Unveils Manifold 2 On-Board Supercomputer to Make Drones Autonomous, https://dronelife.com/2019/05/28/dji-announces-newest-onboard-supercomputer-for-drones-the-manifold-2/, May 29, 2019, 16 pages.
Extreme Tech, Air Travel in 2050: Autonomous Planes Flying in Geese-Like Formations—ExtremeTech, http://www.extremetech.com/extreme/135774-air-travel-in-2050-autonomous-planes-flying-in-geese-like-formations, Aug. 2, 2018, 8 pages.
Helicopter Aviation, Ground Effect, www.copters.com/aero/ground_effect.html, Jul. 23, 2019, 4 pages.
Hof, Hank, Gadss—Concept of Operations, Global and Aeronautical Distress & Safety, Version 6.0, Jul. 6, 2017, 52 pages.
Houston, Sarina, How ADS-B Works: A look at the Foundation of NextGen, https://www.thebalancecareers.com/how-ads-b-works-a-look-at-the-foundation-of-nextgen-282559, Updated Dec. 25, 2017, 13 pages.
Mugunthan et al., Flow Field Investigation of Flat Bottom Aerofoil Under Ground Effect, IOSR Journal of Mechanical and Civil Engineering, vol. 12, Issue 4, Version VI, (Jul.-Aug. 2015), pp. 83-88.
Ravi et al., AERO265 Thesis Paper, Analysis of Wing in Ground Effect Using Potential Flow Theory, RMIT School of Aerospace, Mech. & Manufacturing Eng., (2007), 4 pages.
International Search Report for International Application No. PCT/IB2019/056354 dated Jan. 8, 2020, 4 pages.
International Written Opinion for International Application No. PCT/IB2019/056354 dated Jan. 8, 2020, 5 pages.
Thien et al., Effects of Leader's Position and Shape on Aerodynamic Perfomances of V. Flight Formation, ICIUS, (Oct. 24-25, 2007), pp. 44-49.

\* cited by examiner

AUTONOMOUS AIRCRAFT CONTROL SYSTEMS AND RELATED METHODS

CROSS-REFERENCE TO RELATED APPLICATION

This application claims priority to Provisional U.S. Patent Application Ser. No. 62/711,305, filed Jul. 27, 2018, the disclosure of each of which is hereby incorporated herein in its entirety by this reference.

TECHNICAL FIELD

The disclosure relates to autonomous aircraft, drones, and related systems and methods. In particular, embodiments of the disclosure relate to autonomous aircraft, drones, related control systems, and related methods.

BACKGROUND

Aircraft (e.g., airplanes, gliders, helicopters, jets, etc.) are used to transport people, animal, and other cargo large distances in relatively short amounts of time. Aircraft face challenges that are less common for automobiles due to their ability to travel in three dimensions rather than only 2 dimensions and at much higher rates of speed. Aircraft are governed by the agencies such as the Federal Aviation Administration (FAA), the European Union Aviation Safety Agency (EASA), the International Civil Aviation Organization (ICAO), etc. The Agencies also monitor and control air traffic to prevent midair collisions and ensure the availability of runways (e.g., landing strips) and prioritize access based on schedules, fuel needs, emergency needs, etc. There are many different technological aids for aircraft when approaching runways to aid pilots when landing the aircraft. The Agencies provide rules based on the available technologies that allow aircraft with more technological aids to land in more adverse weather conditions (e.g., low visibility) than those with fewer technological aids.

Autonomous aircraft (e.g., drones) have many uses. Some drones are used to support the military, for example, drones are used for surveillance, cargo delivery, bombing, and close air support. Drones also have been used in non-military roles such as, delivering cargo and packages, aerial photography, geographic mapping, search and rescue, disaster management, agriculture management, wildlife monitoring, law enforcement surveillance, construction management, and storm tracking. Autonomous aircraft can be remotely controlled or preprogrammed to fly specific paths without human intervention following the preprogramming.

BRIEF SUMMARY

Some embodiments of the present disclosure may include an aircraft assistance method. The method may include flying an autonomous aircraft in an area preceding the aircraft. An optimal position for the autonomous aircraft relative to the aircraft may be determined such that vortices created by the autonomous aircraft interact with the aircraft to reduce drag on the aircraft. The autonomous aircraft may then be positioned in the optimal position.

Some embodiments of the present disclosure may include a drone control system. The drone control system may include a plurality of drones. Each drone may include an antenna apparatus, an automatic flight control computer, a device for detecting received command information pertaining to drone formation, and a formation control processor. The antenna apparatus may be for receiving and transmitting command and telemetry information. The formation control processor may be configured to receive and transmit flight information through the antenna apparatus and provide the flight information to the automatic flight control computer. A first drone may be configured to establish a master-slave relationship with at least one other drone of the plurality of drones. The at least one other drone may be configured to follow the first drone in a formation.

Some embodiments of the present disclosure may include a landing assistance system. The landing assistance system may include at least one autonomous aircraft. The at least one autonomous aircraft may be configured to transmit signals to an approaching aircraft. The at least one autonomous aircraft may be configured to provide the approaching aircraft with information regarding a desired horizontal position and a desired vertical position relative to a runway.

Some embodiments of the present disclosure may include a flight assistance system. The flight assistance system may include an autonomous aircraft and at least one non-transitory computer-readable storage medium. The autonomous aircraft may be configured to fly at a speed and altitude substantially similar to an associated aircraft. The at least one non-transitory computer-readable storage medium may store instructions thereon that, when executed by at least one processor, cause the autonomous aircraft to receive data from the associated aircraft. The instructions may also cause the autonomous aircraft to receive atmospheric data from one or more atmospheric sensors. The instructions may further cause the autonomous aircraft to calculate an optimal position of the autonomous aircraft relative to the associated aircraft to minimize drag on the associated aircraft. The instructions may also cause the autonomous aircraft to transmit the optimal position to one or more of the autonomous aircraft and the associated aircraft.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
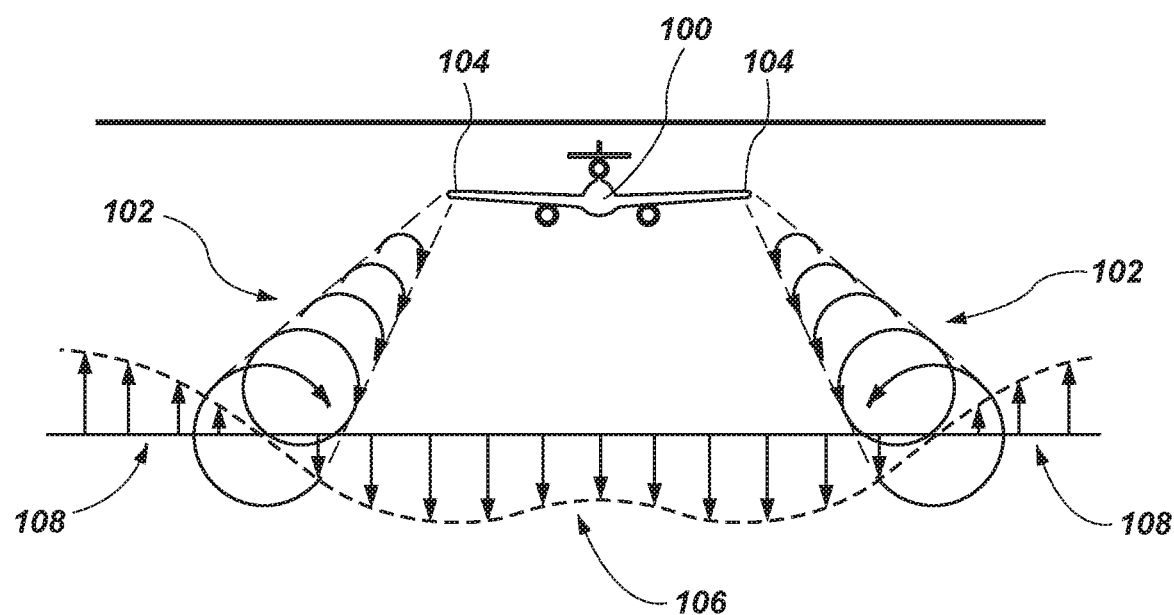
FIG. 1 shows an illustration of the upwash and downwash regions trailing behind an aircraft.

The illustrations presented herein are not meant to be actual views of any particular autonomous aircraft, drone, control system, or component thereof, but are merely idealized representations employed to describe illustrative embodiments. The drawings are not necessarily to scale. Elements common between figures may retain the same numerical designation.

As used herein, any relational term, such as "first," "second," "over," "beneath," "top," "bottom," "underlying," "up," "down," "front," "back," etc., is used for clarity and convenience in understanding the disclosure and accompanying drawings, and does not connote or depend on any specific preference, orientation, or order, except where the context clearly indicates otherwise. For example, these terms may refer to an orientation of elements relative to each other (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements with respect to each other.

As used herein, the term "and/or" means and includes any and all combinations of one or more of the associated listed items.

As used herein, the terms "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

Aircraft consume large amounts of fuel when transporting people and/or goods across large distances. Many factors contribute to the fuel economy of aircraft, for example drag (e.g., air resistance, induced drag, etc.), speed, weight, wind, etc. An increase in the fuel economy of aircraft would likely result in significant cost savings for the operators of the aircraft which could potentially reduce the price of transportation. Extra fuel may also be consumed when aircraft are forced to circle a runway or proceed to a different airport due to visibility concerns and/or communication limitations with air traffic controllers.

Drag on aircraft may be reduced by flying aircraft in a formation (e.g., V formation) such as the formation used by migratory birds. As an aircraft travels through the air, vortices are generated from the wings. These vortices create two airflow regions a down draft region and an updraft region. If another aircraft travels in the updraft region of a preceding aircraft the drag of the following aircraft may be reduced. Commercial aircraft are unable to fully take advantage of this benefit due to safety constraints imposed by the FAA, EASA, ICAO, etc. that require commercial aircraft to maintain a certain distance between each aircraft at cruising altitude. These regulations would inhibit the ability of commercial aircraft to take advantage of fuel savings that could be obtained by flying in a formation.

FIG. 1 illustrates the upwash and downwash regions trailing behind an aircraft. An aircraft 100 traveling through the air may generate vortices 102 spiraling from the wing tips 104 of the aircraft 100. Due to the spiraling nature of the vortices 102, the vortices 102 may generate a downward airflow 106 (e.g., downwash) in an area where the air within the vortices 102 is traveling in a downward direction and an upward airflow 108 (e.g., upwash) in an area where the air within the vortices is traveling in an upward direction. The downward airflow 106 and upward airflow 108 areas may extend up to ten nautical miles behind the aircraft 100.

Figure 2:
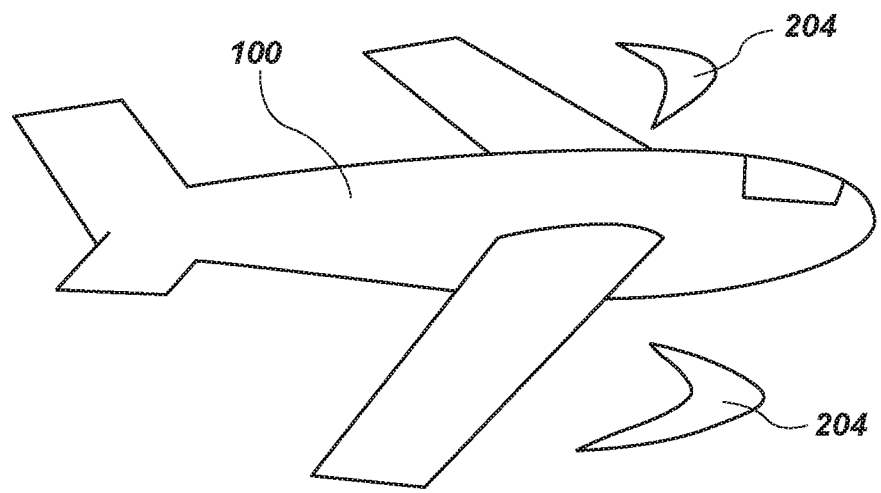
FIG. 2 shows an embodiment according to the present disclosure of an aircraft assistance system.

FIG. 2 demonstrates an embodiment of an aircraft assistance system. In some embodiments, autonomous aircraft (e.g., drones, unmanned aerial vehicles, etc.) may be used to aid aircraft. In some embodiments, an aircraft 100 may be accompanied by at least one companion autonomous aircraft 204. In some embodiments, the autonomous aircraft 204 may be positioned in an area preceding the aircraft 100. The autonomous aircraft 204 may be positioned at a distance from the aircraft 100 and at an angle that coincides with the angle of the vortices leaving the edge of the autonomous aircraft 204 wings such that the aircraft 100 is traveling in the up draft generated by the autonomous aircraft 204. The aircraft 100 may travel a distance between about 10 meters and about 10 nautical miles behind the autonomous aircraft 204, such as between about 1 nautical mile and about 5 nautical miles, or between about 2 nautical miles and about 3 nautical miles. In some embodiments, the autonomous aircraft 204 and the aircraft 100 may maintain the relative displacement using global positioning satellites (GPS). In some embodiments, the autonomous aircraft 204 and the aircraft 100 may utilize LIDAR systems (e.g., LiDAR, LADAR) to maintain the relative displacement. LIDAR systems utilize a pulsed laser and a sensor on one or both aircraft and measures a distance between the two by measuring the time required for the laser pulse to return to the originating aircraft. In some embodiments, the autonomous aircraft 204 may include a LIDAR system. The autonomous aircraft 204 may adjust its position to match any changes in direction from the aircraft 100 to maintain the relative displacement between the autonomous aircraft 204 and the aircraft 100. In some embodiments, the autonomous aircraft 204 may utilize the LIDAR system in conjunction with a GPS system to establish the position of the autonomous aircraft 204 in relation to the aircraft 100.

Figure 3:
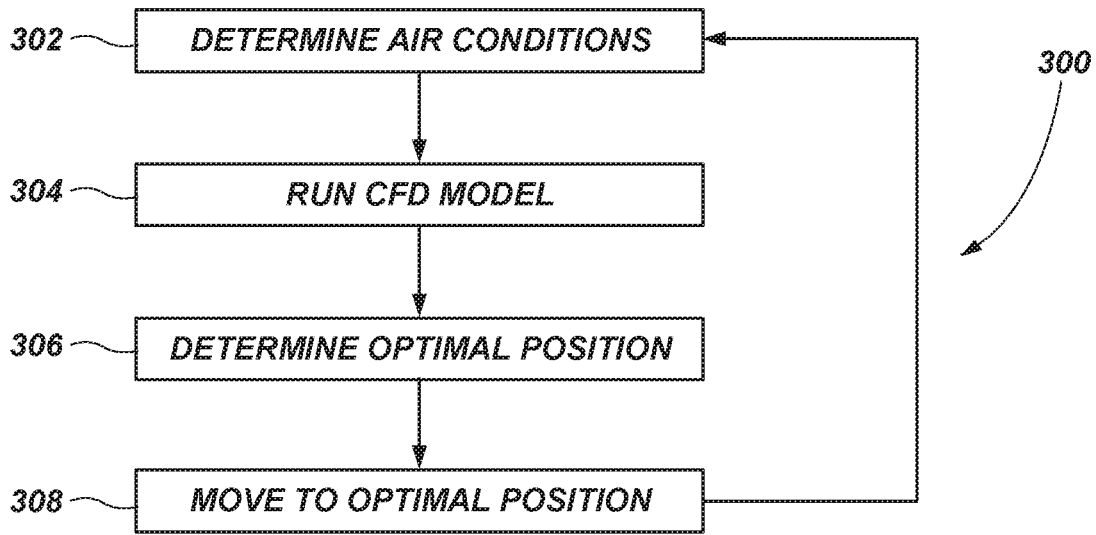
FIG. 3 shows a flow diagram of a process for finding the optimal position between an autonomous aircraft and an aircraft according to an embodiment of the present disclosure.

FIG. 3 illustrates a flow diagram of the process 300 of finding an optimal position for the autonomous aircraft 204 relative to the aircraft 100. Referring to FIG. 2, in some embodiments, the autonomous aircraft 204 may continuously alter its position relative to the aircraft 100 to maintain the aircraft 100 in an optimal location within the upwash of the autonomous aircraft 204. In some embodiments, the autonomous aircraft 204 may utilize on-board sensors such as, air velocity, wind direction, temperature, pressure, turbulence, humidity, etc. to determine the atmospheric conditions surrounding the autonomous aircraft 204, as represented in action 302. The autonomous aircraft may run a computational fluid dynamic (CFD) model utilizing the surrounding atmospheric conditions determined in action 302 within a control system (e.g., control computer, on-board computer, companion computer), as represented in action 304. The CFD model may predict the size, shape, path, and distance of the vortices. The CFD may also predict the upwash and downwash regions in the area behind the autonomous aircraft 204. The autonomous aircraft 204 may determine the optimal location by running the CFD models in action 304, as represented in action 306. The optimal location may be determined based on the size and/or magnitudes of the upwash region and/or downwash regions. For example, some areas of the upwash region may have a stronger upward flow over a concentrated area while other areas of the upwash region may have a weaker upward flow that covers a larger area. The optimal region may depend on the dimensions of the aircraft 100. For example, a smaller aircraft may benefit from the stronger upward flow in a concentrated area whereas a larger aircraft may benefit from the weaker upward flow that covers a larger area. Once the optimal position is determined in action 306, the autonomous aircraft 204 may adjust its position relative to the aircraft 100 such that the autonomous aircraft 204 is positioned in the optimal position, as represented in action 308.

In some embodiments, the autonomous aircraft 204 may transmit the readings from the onboard sensors to a remote computer. The remote computer may run the CFD model and transmit the optimal position to the autonomous aircraft 204. The autonomous aircraft 204 and the remote computer may communicate wirelessly through a wireless communication link, such as radio, SATCOM, LTE®, SIGFOX®, LoRa®, Ku/Ka, etc. Running the CFD model remotely may allow for, among other things, smaller autonomous aircraft 204, faster calculations, and/or greater efficiency.

In some embodiments, once the autonomous aircraft 204 is positioned in the optimal position, a pilot of the aircraft 100 may make fine adjustments, such as adjustments resulting in a change in position of the aircraft 100 relative to the autonomous aircraft 204 of less than about 10 meters, less than about 5 meters, or less than about 1 meter. In some embodiments, the optimal positions of the aircraft 100 and autonomous aircraft 204 may be provided to the pilot. For example, the pilot may receive the optimal positions through a display, such as a heads up display (HUD), a GPS display, a tablet, a computer screen, or other operational display in the cockpit. In some embodiments, the optimal positions may be provided to the pilot through instructions, such as adjusted flight paths, recommended flight adjustments, etc.

Figure 4:
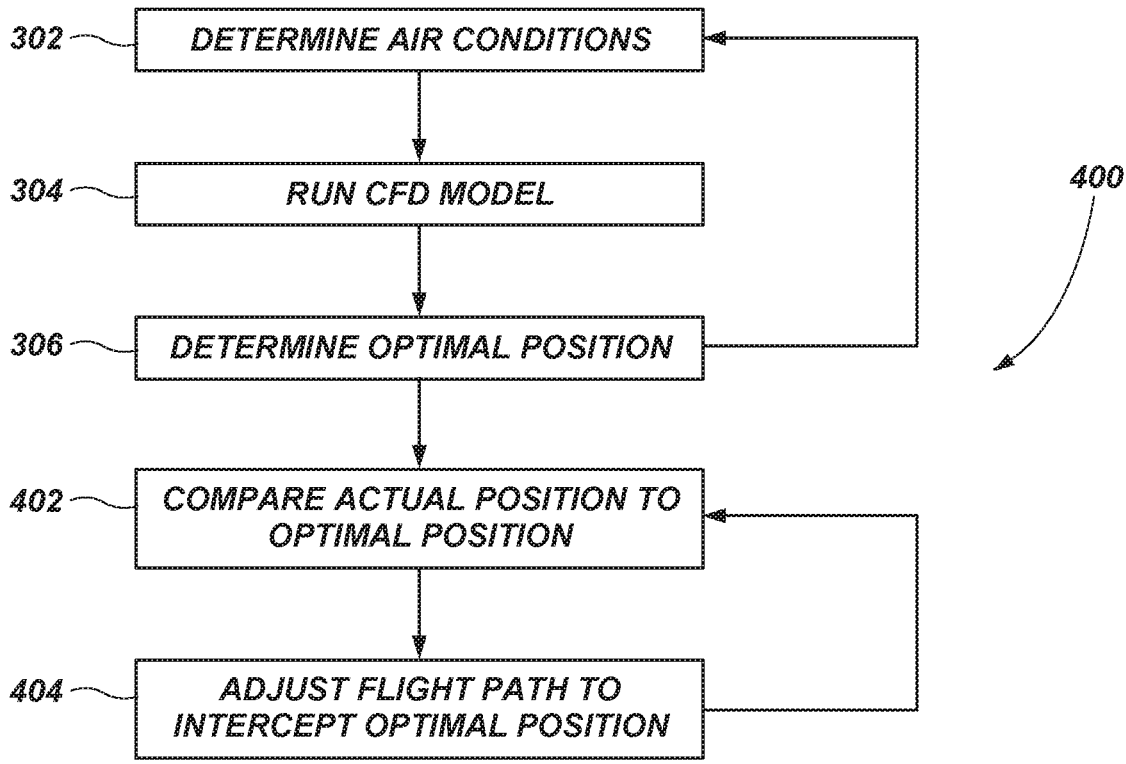
FIG. 4 shows a flow diagram of a process for positioning an autonomous aircraft in an optimal position relative to an aircraft according to an embodiment of the present disclosure.

FIG. 4 illustrates a flow diagram of the process 400 of adjusting the position of the autonomous aircraft 204 relative to the aircraft 100. Referring to FIG. 2, in some embodiments, the CFD models described above may be run at regular intervals, such as every 15 minutes, every 5 minutes, every minute, every 30 seconds, or every second, as represented in actions 302, 304, and 306. In some embodiments, the relative position of the autonomous aircraft 204 may be adjusted using a control system calculation (e.g., PID loop, step and wait function, feedback loop, etc.) based on the optimal position determined in action 306. One of the inputs to the control system calculation may be the actual relative position of the autonomous aircraft 204 with respect to the aircraft 100 and the other input into the control system calculation may be the determined optimal position. The control system may compare the actual relative position to the optimal position, as represented in action 402. Once the control system compares the actual relative position and the optimal position, the control system may adjust the flight path of the autonomous aircraft 204 such that the autonomous aircraft 204 will intercept the optimal position, as represented in action 404. As the actual relative position changes the optimal position may change as the air speed, direction, temperature, pressure, humidity, etc. change. Therefore, the relative position between the aircraft 100 and the autonomous aircraft 204 may be continuously changing as the atmospheric conditions surrounding the two aircraft change causing the optimal position to change. As such, each time the CFD models run the control system calculation may adjust the flight path of the autonomous aircraft 204 to reflect any changes in the optimal position.

In some embodiments, the autonomous aircraft 204 may include a weather radar system. The information from the weather radar system may include atmospheric conditions surrounding the autonomous aircraft 204 (e.g., a weather profile, a weather map, etc.). The autonomous aircraft 204 may input a weather profile into the CFD model to provide a more accurate prediction for the optimal position. In some embodiments, the weather radar system may allow the CFD model to account for changes in atmospheric conditions in the area between the autonomous aircraft 204 and the aircraft 100. In some embodiments, the weather radar system may input atmospheric conditions in an area preceding the autonomous aircraft 204 and allow the control system to position the autonomous aircraft 204 in the optimal position before or as the autonomous aircraft 204 reaches a change in atmospheric conditions.

In some embodiments, the autonomous aircraft 204 may use heat cameras (e.g., infrared cameras, thermal imaging cameras, etc.) to show the vortices generated by the wings of the autonomous aircraft 204. The image generated by the heat camera may be interpreted by the control system in the autonomous aircraft 204. The interpretation of the image may generate information such as the magnitude and direction of the vortices generated by the autonomous aircraft 204. This information may be used to determine an optimal position relative to the aircraft 100 without using CFD. This may allow for a smaller, lighter, and/or more efficient autonomous aircraft due to the reduced processing power. In some embodiments, the image generated by the heat camera may be incorporated into the CFD to reduce the number of calculations required and thereby reduce the processing power required. For example, the CFD may be used only to predict changes in the vortices after leaving the autonomous aircraft 204 given atmospheric conditions as determined by onboard sensors or information from a weather radar system and not to predict the initial size and direction of the vortices. In some embodiments, the image generated by the heat camera may be relayed to a display on the aircraft 100 such as a HUD, a GPS display, a tablet, a computer screen, or other operational display in the cockpit. For example, the image generated by the heat camera may be displayed to enable the pilot to visualize the optimal position of the aircraft 100 relative to the autonomous aircraft 204, such as to make fine adjustments as described above. In some embodiments, the display may include a representation of the aircraft 100 position relative to the vortices. In some embodiments, the heat cameras may be located on the aircraft 100 and configured to capture images of the vortices in the flight path of the aircraft 100.

In some embodiments, the autonomous aircraft 204 and the aircraft 100 may include a wireless communication link (e.g., radio, SATCOM, LTE®, SIGFOX®, LoRa®, Ku/Ka, etc.) such that sensors on the aircraft 100 may be incorporated into the control of the autonomous aircraft 204. In some embodiments, the sensors on the aircraft 100 may include image capturing devices, such as thermal imaging cameras, infrared cameras, ultraviolet imaging devices, visible spectrum cameras, etc. For example, the control system calculation may make adjustments to the relative position between the autonomous aircraft 204 and the aircraft 100 based on input from sensors on the aircraft 100 such as, power output, fuel consumption, drag, etc. In some embodiments, a separate control system calculation may adjust the optimal position based on input from the sensors of the aircraft 100 before the optimal position is applied to the control system calculation for the relative position. In some embodiments, the CFD model may be used for an initial optimal position which may then be continuously adjusted based on input from the sensors on the aircraft 100 such that the autonomous aircraft 204 only runs the CFD model one time. In some embodiments, the CFD model may be run based on known atmospheric conditions on a separate computer. The results of the CFD model may then be input into the autonomous aircraft 204 as a baseline for the optimal position with the only optimization running aboard the autonomous aircraft 204 being based on the input from the sensors on the aircraft 100. For example, the optimization may be a feedback loop (e.g., step and wait, PID loop, etc.) configured to minimize a sensor reading from the aircraft such as, thrust, air resistance, drag, etc.

In some embodiments, the wireless communication link may allow sensors on the autonomous aircraft 204 to be incorporated in to the control of the aircraft 100. For example, the aircraft 100 may include gauges or displays providing information such as weather information, air conditions, etc. that may be provided by the autonomous aircraft 204 through the wireless communication link. In some embodiments, the wireless communication link may allow the autonomous aircraft 204 to take control of the aircraft 100. For example, the autonomous aircraft 204 may take control of the aircraft 100 to position the aircraft 100 in an optimal position relative to the autonomous aircraft 204 or to aid in difficult maneuvers such as landing, take off, turbulence, etc.

In some embodiments, aircraft regulations may limit the allowable distance between the autonomous aircraft 204 and the aircraft 100. If the optimal position is within a distance that is prohibited by regulation the autonomous aircraft 204 may select the best position that is not in a prohibited region.

In some embodiments, the aircraft 100 may be accompanied by more than one companion autonomous aircraft 204. The autonomous aircraft 204 and the aircraft 100 may fly in a formation. Some aircraft regulations may have exceptions for aircraft flying in formation. Flying multiple autonomous aircraft 204 in formation with the aircraft 100 may allow the aircraft 100 to be positioned in an optimal location relative to the autonomous aircraft 204 regardless of minimum distances otherwise imposed by aircraft regulations. In some embodiments, each autonomous aircraft 204 may calculate its optimal position relative to the aircraft 100 independently.

In some embodiments, one of the autonomous aircraft 204 may serve as the master and the other autonomous aircraft 204 may be slaves. The master autonomous aircraft 204 may run the CFD model accounting for each autonomous aircraft 204 and send positioning information to each autonomous aircraft 204 through wireless communication. In some embodiments, each autonomous aircraft 204 may include on-board sensors for determining air conditions surrounding each autonomous aircraft 204. The information from each sensor may be communicated to the master autonomous aircraft 204 and incorporated into the CFD model. In some embodiments, the master autonomous aircraft 204 may determine atmospheric conditions with a weather radar system independently from any sensor information on the slave autonomous aircraft 204.

In some embodiments, the slave autonomous aircraft 204 may be configured to track the movement of the master autonomous aircraft 204 and fly in a predetermined formation. The master autonomous aircraft 204 may include the predetermined formation in the CFD model such that the master autonomous aircraft 204 determines the optimal position of the formation relative to the aircraft 100 and adjusts the flight pattern of the master autonomous aircraft 204 accordingly. As the master autonomous aircraft 204 adjusts its flight pattern the slave autonomous aircraft 204 may continue to follow the autonomous aircraft in formation. In some embodiments, the master autonomous aircraft 204 may transmit its flight path to the slave autonomous aircraft 204. In some embodiments, each slave autonomous aircraft 204 may be configured with sensors to track the movements of the master autonomous aircraft individually and each slave autonomous aircraft 204 may position itself according to the sensor readings. In some embodiments, each slave autonomous aircraft 204 may be configured to position itself relative to one of the other autonomous aircraft 204. For example, a first slave autonomous aircraft 204 may be configured to position itself relative to the master autonomous aircraft 204, a second slave autonomous aircraft 204 may be configured to position itself relative to the first slave autonomous aircraft, and a third slave autonomous aircraft 204 may be configured to position itself relative to the second slave autonomous aircraft to form a formation.

In some embodiments, a master autonomous aircraft 204 may control the formation of autonomous aircraft 204 from a remote location (e.g., not in the formation). For example, the master autonomous aircraft 204 may fly in the area ahead of the formation and survey weather conditions and/or atmospheric conditions and determine the most efficient route based on air velocity, density, temperature, etc. The master autonomous aircraft 204 may control movement of the formation as a whole based on weather conditions. In some embodiments, the master autonomous aircraft 204 may control the movements of the formation as a whole and the movement of the individual autonomous aircraft 204 within the formation.

Figure 5:
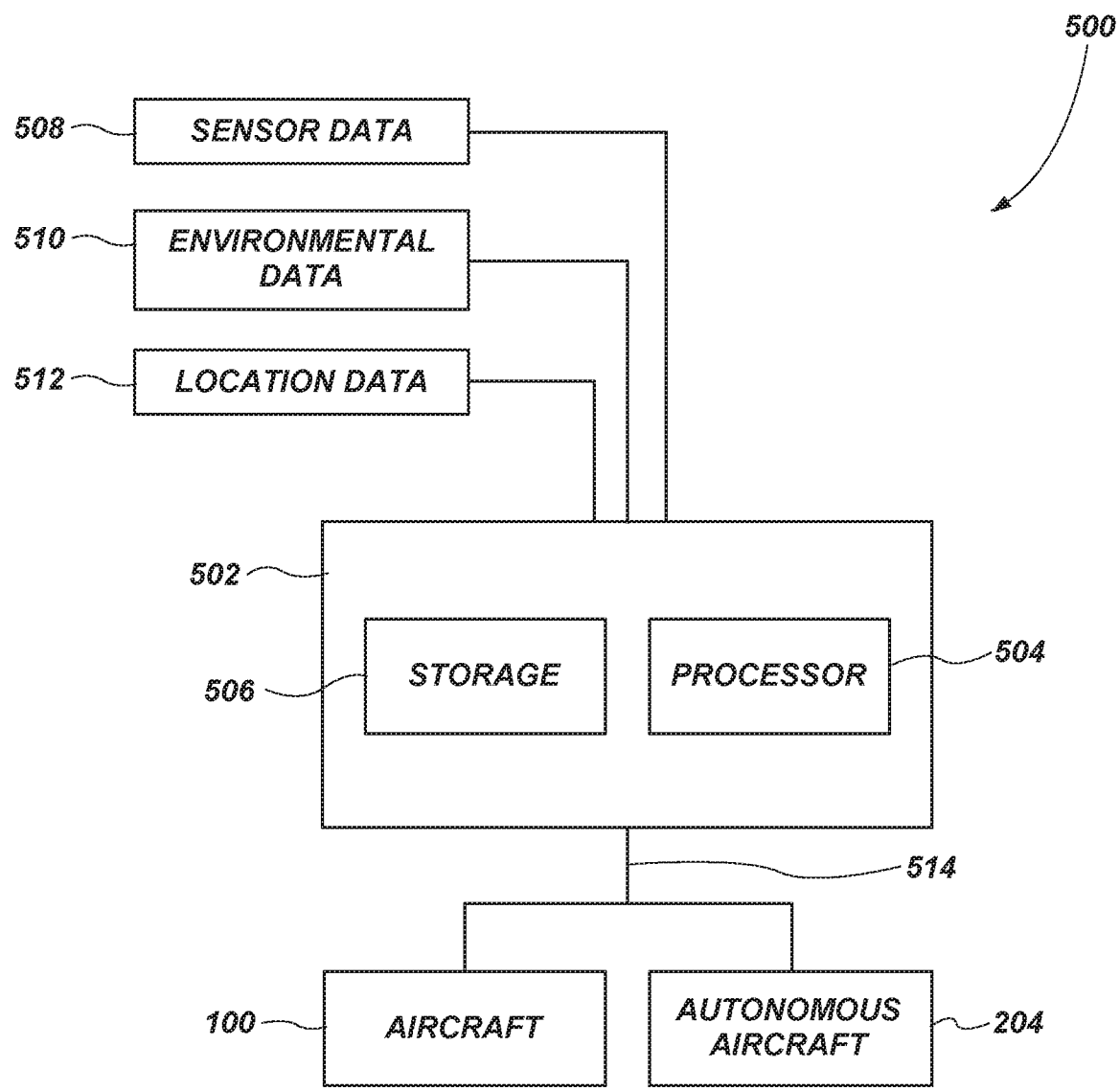
FIG. 5 shows a system diagram of computing device according to an embodiment of the present disclosure.

FIG. 5 illustrates a control system 500. The control system 500 may be configured to coordinate flight information between the aircraft 100 and the autonomous aircraft 204. In some embodiments, the control system 500 may be configured to coordinate flight information between one or more separate aircraft 100, between one or more autonomous aircraft 204, or any combination of aircraft 100 and autonomous aircraft 204. The control system 500 may include a computing device 502 with at least one processor 504 and at least one storage device 506. The processor 504 may be configured to execute one or more algorithms (e.g., programs, software code, instructions, etc.) stored in the at least one storage device 506. The computing device 502 may be configured to receive data from the aircraft 100 and/or the autonomous aircraft 204. The data may include sensor data 508, environmental data 510 (e.g., atmospheric data, weather data, etc.), and/or location data 512 (e.g., relational position data, GPS data, etc.). In some embodiments, the computing device 502 may be configured to receive data from another computing device such as a server, a network device, the cloud, etc. For example, data such as the environmental data 510 may be received from a weather service computing device.

In some embodiments, the computing device 502 may be located in the aircraft 100. In some embodiments, the computing device 502 may be located in the autonomous aircraft 204. In other embodiments, the computing device 502 may be located in another remote location such as a control center on the ground or a satellite. The computing device 502 may communicate with the aircraft 100 and/or the autonomous aircraft 204. For example, the computing device may communicate wirelessly with the aircraft 100 and/or the autonomous aircraft 204 through the wireless communication link.

In some embodiments, the one or more algorithms executed by the processor 504 may include modelling calculations such as those described above to model vortices of the autonomous aircraft. In some embodiments, the one or more algorithms may include calculations to determine the optimal position of the aircraft 100 relative to the autonomous aircraft 204, such as those described above with respect to FIGS. 3 and 4.

The algorithms may produce data such as positional data (e.g., distance, vectors, velocities, altitude, etc.), flight path corrections (e.g., yaw, pitch, roll, speed, etc.), imaging data (e.g., models, overlays, etc.), control instructions (e.g., computer readable instructions, etc.), and/or other forms of data. For example, the algorithms may provide positional data to the aircraft 100 and/or the autonomous aircraft 204 representative of the respective optimal position of the aircraft 100 and/or the autonomous aircraft 204 relative to the opposite aircraft 100 and/or autonomous aircraft 204. In some embodiments, the algorithms may be configured to control the autonomous aircraft 204 and/or the aircraft 100 to position the autonomous aircraft 204 and/or the aircraft 100 in the optimal position with respect to the other aircraft 100, 204 through, for example, computer readable instructions.

In some embodiments, the algorithm may produce imaging data such as a model representative of the vortices, down draft, up draft, etc. that may be displayed, for example, in the cockpit of the aircraft 100 to enable the pilot to visualize the optimal position of the aircraft 100 with respect to the autonomous aircraft 204. The imaging data may be displayed in the cockpit through a display such as a HUD, a GPS display, a tablet, a computer screen, or other operational display. In some embodiments, the imaging data may include a visual indication of the actual position of the aircraft 100, such as a point, an arrow, an illustration of an aircraft, etc. In some embodiments, the imaging data may include imaging data generated by camera devices such as heat cameras. For example, the computing device 502 may receive imaging data from a camera device and overlay a position of the aircraft 100 and/or autonomous aircraft 204 on the imaging data based on the location data 512. The overlaid image may be provided to the cockpit display to provide the pilot with a visual representation of the positions of the aircraft 100 and/or autonomous aircraft 204 with respect to the vortices as captured by the heat cameras.

The communication 514 between the computing device 502 and the aircraft 100 and/or autonomous aircraft 204 may be wired or wireless communication. For example, if the computing device 502 is located in the aircraft 100, the communication 514 between the computing device 502 and the aircraft 100 may be wired communication, such as network communication (e.g., ADN, Ethernet, Telenet, SMTP, FTP, TCP, MSTP, etc.). The communication 514 between the computing device 502 on the aircraft 100 and the autonomous aircraft 204 may be wireless, such as through the wireless communication link described above. In another embodiment, the computing device 502 may be located in the autonomous aircraft 204. In some embodiments, the computing device 502 may communicate with the control system of the autonomous aircraft 204 through a wired connection or a pinned connection. For example, the computing device 502 may be integrated with the control system of the autonomous aircraft 204. The communication 514 between the computing device 502 located on the autonomous aircraft 204 and the aircraft 100 may be wireless, such as through the wireless communication link.

Figure 6:
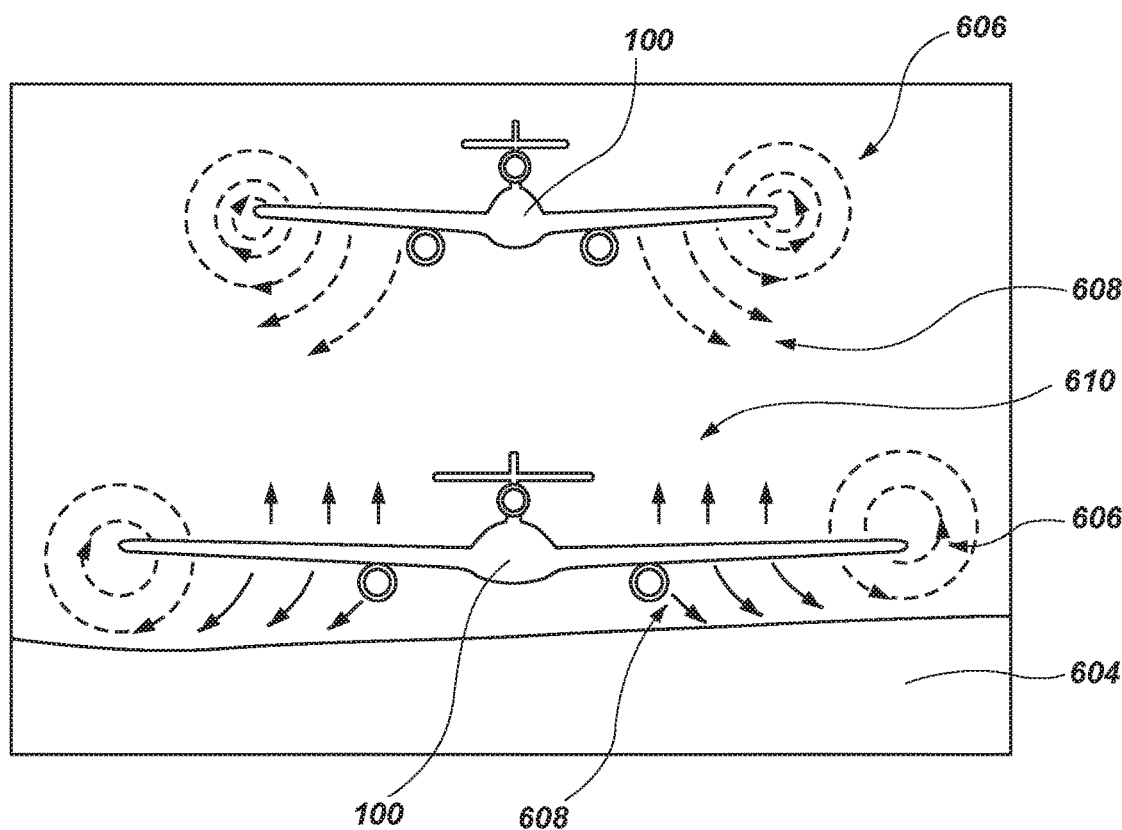
FIG. 6 shows an illustration of ground effect.

FIG. 6 illustrates an aerodynamic phenomenon known as "ground effect." Ground effect occurs when an aircraft 100 is flown close to the ground 604. When the aircraft 100 is flown close to the ground 604 wingtip vortices 606 are unable to form effectively due to the proximity to the ground 604. Drag is effectively lowered and the velocity and lift increase. Ground effect results in a reduction of downwash 608 which leads to a lifting force 610 (e.g., cushion or floating effect). There are at least two types of ground effect commonly referred to as span-wise and chord-wise. Span-wise ground effect generally reduces induced drag on an aircraft. Chord-wise ground effect increases lift experienced by the aircraft. The chord-wise ground effect may be effected most by the distance between the aircraft 100 and the ground 604. The chord-wise ground effect may be estimated by the following equation.

$$C_{Lground} = C_L(h/c)^{-0.11}$$

Where $C_{Lground}$ represents the lift coefficient resulting from the chord-wise ground effect, $C_L$ represents the lift coefficient of the aircraft 100 in open air, h represents the distance between the aircraft 100 and the ground 604, and c represents the chord length of the wing of the aircraft 100.

Figure 7:
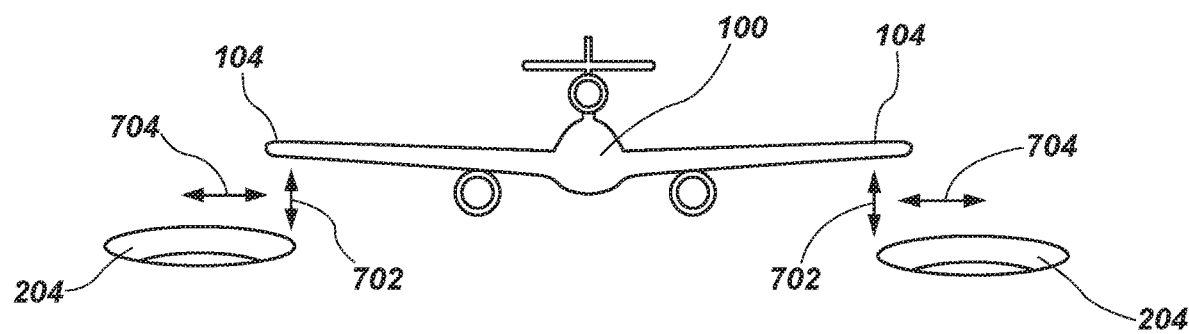
FIG. 7 shows an embodiment according to the present disclosure of an aircraft assistance system.

FIG. 7 illustrates an embodiment of an aircraft assistance system. In some embodiments, an autonomous aircraft 204 or a plurality of autonomous aircraft 204 may simulate the ground effect by flying beneath the aircraft 100. The autonomous aircraft may utilize on-board sensors to generate a CFD model to determine an optimal position that maximizes the ground effect.

In some embodiments, the optimal position may be determined using the formula described above coupled with another algorithm such as a CFD model and/or another optimizing calculation such as a PID, step and wait, feedback loop, etc. configured to optimize a measured parameter such as, power output, fuel consumption, drag, etc. In some embodiments, additional processes, such as radar vectors, camera positioning, visual positioning, etc. may be used to optimize a position between the autonomous aircraft 204 and the aircraft 100 for optimal ground effect. In some embodiments, the optimal position may be determined and transmitted to the aircraft 100 and/or autonomous aircraft 204 by the computing device 502, described above with respect to FIG. 5.

The autonomous aircraft 204 may be positioned a distance 702 below the wing tips 104 of the aircraft. The distance 702 may be between about 0 feet (0 meters) and 100 feet (30.48 meters) below the wing tips 104, such as between about 5 feet (1.524 meters) and about 90 feet (27.43 meters), or between about 30 feet (9.144 meters) and about 80 feet (24.38 meters). In some embodiments, the distance 702 below the wing tips 104 of the aircraft 100 may be determined as a function of a wingspan of the aircraft 100 (e.g., a distance between the wing tips 104). For example, the distance 702 may be between about 1 wingspan and about 0.1 wingspans, such as between about 0.5 wingspan and about 0.2 wingspans. The autonomous aircraft 204 may also be positioned a lateral displacement 704 from the wing tips 104. The lateral displacement 704 may be between about 0 feet (0 meters) and 100 feet (30.48 meters) laterally from the wing tips 104, such as between about 5 feet (1.524 meters) and about 90 feet (27.43 meters), or between about 30 feet (9.144 meters) and about 80 feet (24.38 meters). As an elevation of the aircraft 100 increases, at least one of the distance 702 and the lateral displacement 704 between the aircraft 100 and the autonomous aircraft 204 may be reduced to compensate for atmospheric conditions that may change at the increased elevation.

In some embodiments, simulated ground effect may be used to assist (e.g., carry, float, etc.) a damaged or malfunctioning aircraft to maintain flight until a safe landing area is reached. In some embodiments, simulated ground effect may be used to reduce the drag on an aircraft 100 thereby increasing the fuel efficiency, speed, range, etc. of the aircraft 100.

Figure 8:
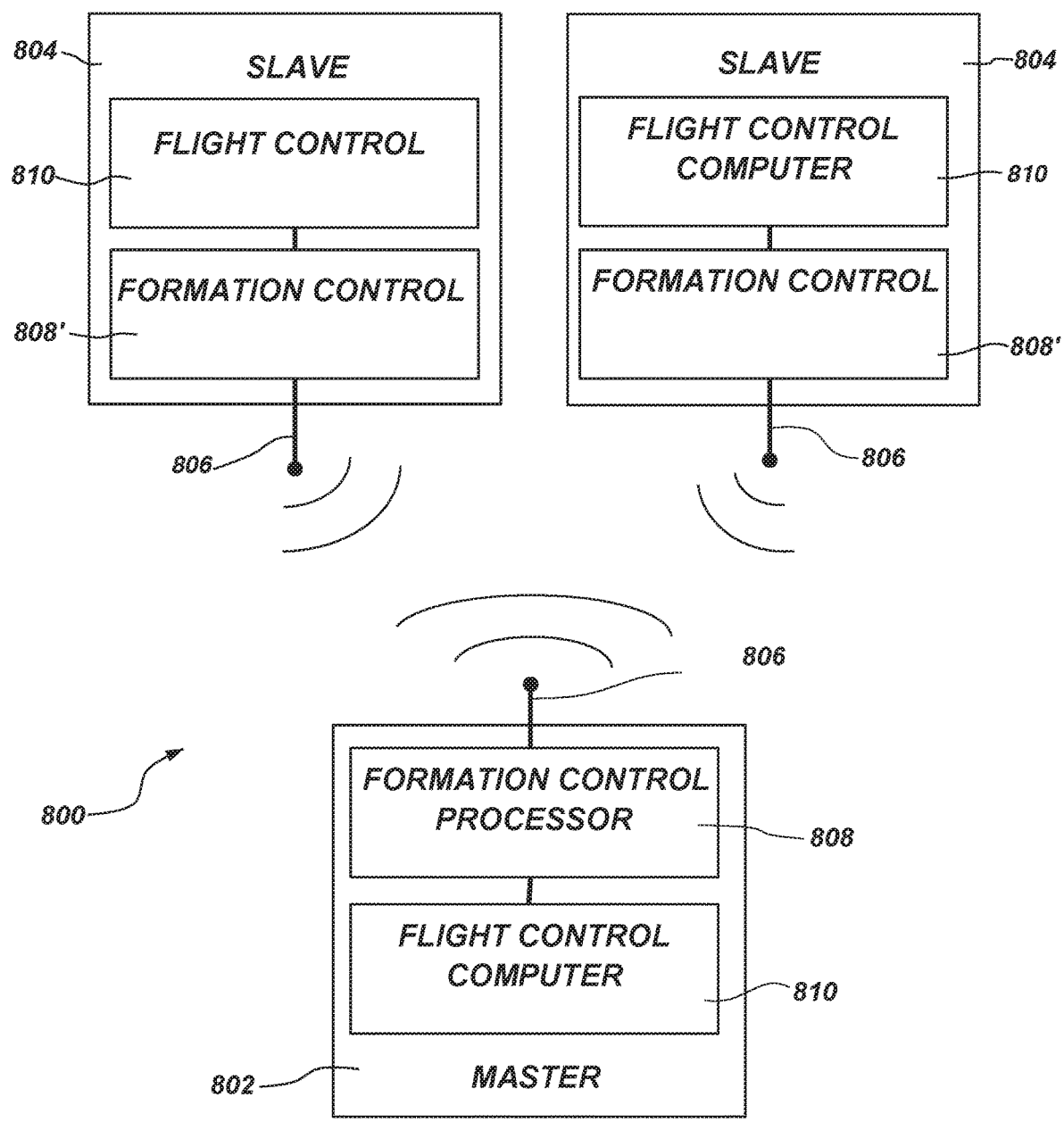
FIG. 8 shows a system diagram of an embodiment of a drone control system according to the present disclosure.

FIG. 8 illustrates an embodiment of a drone control system 800. In some embodiments, the plurality of autonomous aircraft may include a master autonomous aircraft 802 and at least one slave autonomous aircraft 804. The master autonomous aircraft 802 may calculate an optimal position for each of the plurality of autonomous aircraft. The master autonomous aircraft 802 may then transmit the positioning information to the at least one slave autonomous aircraft 804. In some embodiments, each of the plurality of autonomous aircraft may include an antenna apparatus 806 (e.g., receiver, transmitter, etc.) configured to receive and/or transmit telemetry information, positioning information, atmospheric conditions, weather conditions, adjustments, etc.

In some embodiments, the slave autonomous aircraft 804 may transmit atmospheric conditions, weather conditions, etc. to the master autonomous aircraft 802 as determined by onboard sensors. The master autonomous aircraft 802 may receive the atmospheric conditions and weather conditions and process the conditions in a formation control processor 808. In some embodiments, the formation control processor 808 may include a computer configured to run a CFD model based on the atmospheric and weather conditions. In some embodiments, the formation control processor 808 may process the atmospheric and weather conditions and upload the conditions to a remote computer that may run the CFD model. The formation control processor 808 may then determine an optimal position of the master autonomous aircraft 802 and the corresponding slave autonomous aircraft 804.

The master autonomous aircraft 802 may transmit the optimal position information to the slave autonomous aircraft 804 through the antenna apparatus 806. In some embodiments, the optimal position information may be a relative position (e.g., the position of the slave autonomous aircraft 804 relative to the master autonomous aircraft 802 or the position of the slave autonomous aircraft 804 relative to an aircraft 100 (FIG. 6)). In some embodiments, the optimal position information may be independent positioning information (e.g., GPS coordinates, a flight path, latitude and longitude points, etc.). The slave autonomous aircraft 804 may receive the optimal position information through the corresponding antenna apparatus 806. The slave autonomous aircraft may process the position information in a formation control processor 808'. The formation control processor 808' in the slave autonomous aircraft 804 may process the position of the slave autonomous aircraft 804 relative to the optimal position transmitted from the master autonomous aircraft 802. In each autonomous aircraft 802, 804 the position information processed by the formation control processor 808, 808' may be transmitted to a flight control computer 810. The flight control computer 810 may make the necessary adjustments to the flight path of the respective autonomous aircraft to intercept the optimal position as processed by the formation control processor 808, 808'.

Another difficulty faced by aircraft that can result in unnecessary fuel consumption is circling an airport or redirecting aircraft to other runways based on visibility or other landing concerns. Visibility can be affected by many factors, such as geography, weather, natural disasters (e.g., wildfire smoke), etc. Many modern airports have implemented Instrument Landing Systems (ILS) that provide radio waves to approaching aircraft that can be intercepted by a companion ILS system on the approaching aircraft to provide the pilot with both a vertical and a horizontal guidance during the landing approach, an example of which is described in U.S. Pat. No. 4,586,049, the disclosure of which is incorporated in its entirety by this reference. The horizontal guidance is referred to as localizer (LOC) and the vertical guidance is referred to as glideslope (GS). ILS systems require both the runway and the aircraft to be equipped with the appropriate equipment to communicate both the LOC and the GS signals. Therefore, even if a modern airport is equipped with an ILS system an aircraft that does not have a compatible ILS system cannot take advantage of the ILS system in a low visibility situation and may be forced to circle the runway awaiting improved visibility or face a redirection to a different runway with higher visibility.

Geography can present additional limitations for aircraft approaching a runway. Geographic obstacles can present both visibility problems and line of sight communication problems for approaching aircraft. Therefore, geographic obstacles may interfere with ILS systems and interfere with any advantages provided by the ILS systems.

Figure 9:
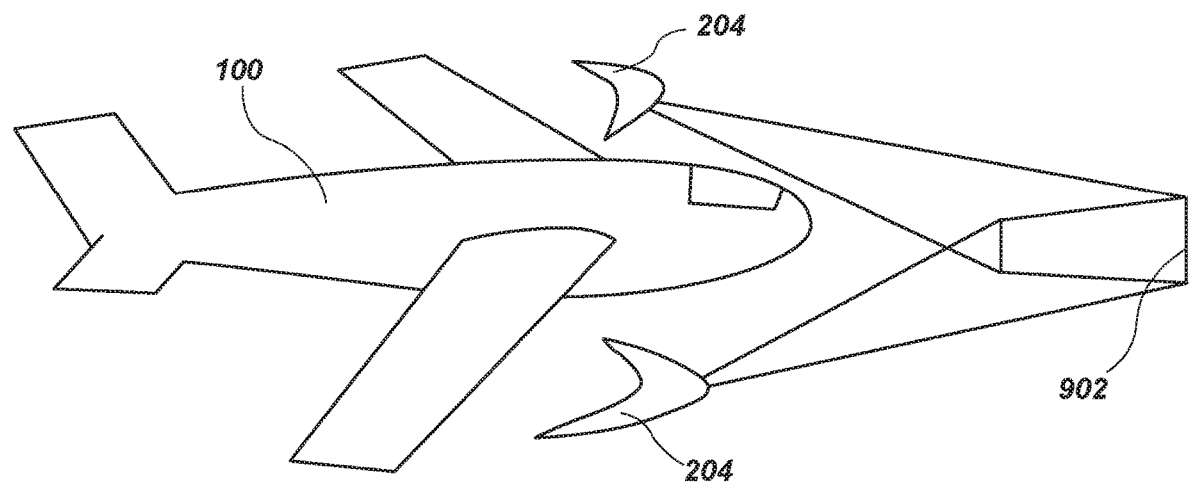
FIG. 9 shows an embodiment according to the present disclosure of an aircraft assistance system.

FIG. 9 demonstrates an embodiment of an aircraft assistance system. In some embodiments, the companion autonomous aircraft 204 may provide technological assistance to the aircraft 100. For example, some older aircraft or less expensive hobby aircraft do not have the proper equipment to fully take advantage of ILS systems at modern airports. The autonomous aircraft 204 may include the necessary equipment (e.g., receivers, sensors, transmitters, etc.) to receive and interpret (e.g., translate) the signals from an ILS system at an airport (e.g., LOC and GS, the horizontal and vertical position of the aircraft 100 relative to the runway). In some embodiments, the information received by the autonomous aircraft 204 may be interpreted and transmitted through wireless communication to the pilot of the aircraft 100 in a format readable by the control computer on the aircraft 100. For example, the aircraft may include a control computer that could receive the raw data (e.g., distances from center of the runway and vertical offset from the preferred approach height) as interpreted by the autonomous aircraft 204. In some embodiments, the autonomous aircraft 204 may take control of the aircraft 100 through the control computer similar to an autopilot to guide the aircraft to a safe landing. In some embodiments, a display in the cockpit, such as a HUD, GPS, tablet, computer, etc. may be configured to receive and display ILS information and/or navigational information from the autonomous aircraft. For example, an aircraft that is not ILS capable may be enabled to utilize an ILS system through a software update or communication chip allowing a display in the cockpit to communicate with the autonomous aircraft 204 that is ILS capable.

In some embodiments, the ILS may be used to aid pilots in low visibility situations. The autonomous aircraft 204 may be configured to generate a virtual image 902 (e.g., projection, holographic image) of an area visible to the autonomous aircraft 204 such as the runway in an area in front of the aircraft 100 that is visible to the pilot of the aircraft 100. In some embodiments, the virtual image 902 may be provided by projecting a single line representing the center line of the runway. In some embodiments, the virtual image may be a representation of the runway as it would appear if the visibility were not poor such that the pilot can estimate the appropriate approach angle, speed, angle of attack, etc. visually. In some embodiments, the virtual image 902 may be projected onto the clouds, vapor (e.g., fog), or smoke in front of the aircraft such that the image only appears on the object or cloud that is impairing the pilot's visibility. In some embodiments, multiple projectors may be used to generate a holographic image regardless of any clouds or other objects impairing visibility. In some embodiments, an autonomous aircraft 204 may provide a smoke screen (e.g., artificial smoke, cloud, etc.) on which the virtual image 902 may be projected. For example, a lead autonomous aircraft 204 may fly a distance ahead of the aircraft 100 expelling a smoke screen while other autonomous aircraft 204 project the virtual image 902 on the smoke screen.

In some embodiments, the virtual image 902 may be projected in front of aircraft 100 while traversing an airport on the ground (e.g., taxiing). The virtual image 902 may be used to coordinate movements in a busy airport, or guide unfamiliar pilots through complicated travel lanes. For example, the virtual image 902 may be a map of the airport. In some embodiments, the virtual image 902 may include markers for the position of the aircraft 100 and/or the desired destination. In some embodiments, the virtual image 902 may include a recommended path or a specific required path set out by traffic controllers at the airport. In some embodiments, the virtual image 902 may be a stop or go indicator at intersections.

In some embodiments, the virtual image 902 may be communicated wirelessly to receiver equipment in the cockpit of the aircraft to generate the virtual image 902 onto a HUD, a tablet, or other screen in the cockpit. In some embodiments, the virtual image 902 may simply show the aircraft 100 and its virtual representation to the runway similar to a video game display. In some embodiments, real time images from image capturing equipment on the ground may be displayed in virtual reality quality (e.g., realistic images, real appearance). In some embodiments, the pilot may have the ability to interact with the autonomous aircraft 204 through the receiver equipment in the cockpit. For example, in some embodiments, the pilot may be able to request additional information from the autonomous aircraft 204, such as, weather conditions, flight path, recommended approach angle, actual ground images, different views, etc. In some embodiments, the pilot may be able to control aspects of the autonomous aircraft 204 from the receiver equipment. For example, the pilot may be able to control an autonomous aircraft 204 to create a smoke screen for projecting the virtual image 902, or adjust a distance between the autonomous aircraft 204 and the aircraft 100 to increase the safety margin.

In some embodiments, airports and/or aircraft may include cameras capturing images of the runways. The images from the cameras may be relayed to the autonomous aircraft 204. The autonomous aircraft 204 may generate the virtual image 902 using images from the cameras. The virtual image 902 may be generated in any of the methods presented herein for relaying the images from the cameras to the pilot of the aircraft 100.

In some embodiments, airports or runways may have interceptor drones that intercept approaching aircraft and relay at least the ILS information to the approaching aircraft. In some embodiments, interceptor drones may line the approach and project the GS and LOC line(s) (e.g., guideline, path, recommended path, etc.) visually such that any approaching aircraft can follow the line and approach at the correct angle regardless of the visibility or the technology in the approaching aircraft. In some embodiments, the interceptor drones may fly a short distance ahead of the approaching aircraft leading the approaching aircraft through a visibility barrier until the runway is visible. In some embodiments, the interceptor drones may lead the approaching aircraft through a visibility barrier while simultaneously relaying ILS information wirelessly to the aircraft.

In some embodiments, interceptor drones may be provided in lieu of an ILS system. For example, some airports and/or runways are not equipped with an ILS system (e.g., the runway does not produce ILS signals). The interceptor drones may provide information to the approaching aircraft that is similar to the information that would be provided by an ILS system. Alternatively the interceptor drones may be programmed with the exact approach necessary such that the interceptor drones may lead the approaching aircraft down the correct path, through any of the above mentioned methods, as if following an ILS signal, where no ILS signal is available. In some embodiments, the companion autonomous aircraft 204 may provide similar functionality to an interceptor drone through programming or uploaded information.

In some embodiments, the autonomous aircraft 204 may operate in close proximity with the aircraft 100. In some embodiments, the autonomous aircraft 204 may include micro jet engines configured to enable the autonomous aircraft 204 to at least match cruising speed, altitude, etc. with the aircraft 100. In some embodiments, the autonomous aircraft 204 may include a light weight power source such as hydrogen fuel cells. The autonomous aircraft 204 may be manufactured from lightweight materials such as, composites (e.g., carbon fiber, fiberglass, etc.), foam (e.g., extruded polystyrene foam, extruded polystyrene foam, rigid polyurethane foam, etc.), plastics (e.g., polyvinyl chloride, polyethylene, polycarbonate, polypropylene, acrylonitrile butadiene styrene, etc.), or nylon. In some embodiments, the autonomous aircraft 204 may be configured such that accidental impact with the aircraft 100 will cause minimal damage to the aircraft 100 (e.g., less than or at most similar to a bird strike).

Figure 10:
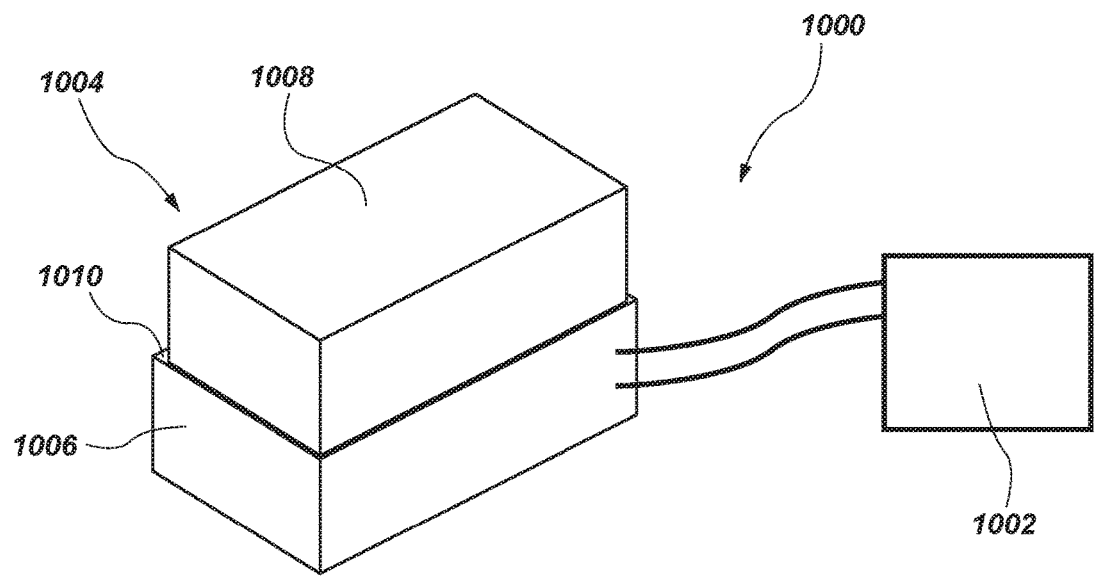
FIG. 10 shows an impact protection system according to an embodiment of the present disclosure.

FIG. 10 illustrates an impact protection system 1000, referring generally to FIGS. 1-9. In some embodiments, the autonomous aircraft 204 may include a system configured to crush a battery pack within the autonomous aircraft 204 when an impact is imminent to avoid any explosion or battery acid damage from impacting the aircraft 100.

In some embodiments, the system may include a proximity sensing device 1002 such as, a proximity sensor (e.g., magnetic sensor, IR sensor, etc.) or a threshold distance as measured by a LIDAR system such that the battery crush is triggered when the threshold distance is met. The threshold distance may be between 36 in. (91.44 cm.) and about 1 in (2.54 cm.), such as between about 12 in. (30.48 cm.) and about 3 in. (7.62 cm.), or between about 8 in. (20.32 cm.) and about 5 in. (12.70 cm.). In some embodiments, the battery may be contained in a sealed compressible container 1004. The compressible container 1004 may include a larger portion 1006 and a smaller portion 1008 configured to fit within the larger portion 1006. The smaller portion 1008 may have external dimensions similar to the internal dimensions of the larger portion 1006. There may be a seal 1010 formed between the larger portion 1006 and the smaller portion 1008. The seal may be formed from a flexible acid resistant material (e.g., rubber, nylon, latex, nitrile, neoprene, etc.). The compressible container 1004 may include an actuator (e.g., electronic actuator, pneumatic actuator, hydraulic actuator) configured to compress the smaller portion 1008 into the larger portion 1006.

In some embodiments, the actuator may be connected to the proximity sensing device 1002. The proximity sensing device 1002 may trigger the actuator when the threshold distance is met. In some embodiments, the battery of the autonomous aircraft 204 may be contained in the compressible container 1004. If a malfunction occurs and the autonomous aircraft 204 is in an area near the aircraft 100 such that a collision is imminent as determined by the proximity sensing device 1002, the proximity sensing device 1002 may trigger the actuator to compress the compressible container 1004 thereby crushing the battery and maintaining any residual battery acid and materials within the compressible container 1004. Crushing the battery may reduce the risk of explosion or acid leaks from an impact between the autonomous aircraft 204 and the aircraft 100.

The present disclosure further includes the following embodiments:

Embodiment 1: An aircraft assistance method comprising: flying an autonomous aircraft in an area preceding an aircraft; determining an optimal position for the autonomous aircraft relative to the aircraft such that vortices created by the autonomous aircraft interact with the aircraft to reduce drag on the aircraft; positioning the autonomous aircraft in the optimal position.

Embodiment 2: The method of Embodiment 1, wherein the autonomous aircraft is not remotely controlled.

Embodiment 3: The method Embodiments 1 or 2, further comprising determining a position and a magnitude of the vortices is with image data from a heat camera.

Embodiment 4: The method of any one of Embodiments 1 through 3, further comprising determining the optimal position with a modeling algorithm.

Embodiment 5: The method of Embodiment 4, further comprising adjusting the optimal position with a feedback loop.

Embodiment 6: The method of Embodiment 5, wherein the feedback loop compares an induced drag measurement from the aircraft.

Embodiment 7: The method of any one of Embodiments 1 through 5, further comprising positioning a plurality of autonomous aircraft in independently optimal positions such that the vortices of each of the plurality of autonomous aircraft interact with the aircraft.

Embodiment 8: The method of any one of Embodiments 1 through 7, further comprising providing the optimal position to the aircraft.

Embodiment 9: The method of Embodiment 8, wherein providing the optimal position to the aircraft comprises displaying a visual representation of the optimal position.

Embodiment 10: The method of any one of Embodiments 1 through 8, wherein the autonomous aircraft further comprises an impact protection system comprising: an electrical power source; a proximity sensing device configured to produce a signal when a threshold distance between the autonomous aircraft and the aircraft is reached; and a compressible container containing the electrical power source configured to crush the electrical power source upon receiving the signal from the proximity sensing device.

Embodiment 11: A drone control system comprising: a plurality of drones, wherein each drone includes: an antenna apparatus for receiving and transmitting command, location, and telemetry information; an automatic flight control computer; and a formation control processor configured to receive and transmit flight information through the antenna apparatus and provides the flight information to the automatic flight control computer; and wherein a first drone is configured to establish a master-slave relationship with at least one other drone of the plurality of drones where the at least one other drone is configured to follow the first drone in a formation.

Embodiment 12: The drone control system of Embodiment 11, wherein the first drone is configured to establish a master-slave relationship with each drone of the plurality of drones such that the plurality of drones flies in a predetermined formation with the first drone being the only drone of the plurality of drones configured to be independently controlled.

Embodiment 13: A landing assistance system comprising: at least one autonomous aircraft configured to transmit signals to an approaching aircraft; wherein the at least one autonomous aircraft is configured to provide the approaching aircraft with information regarding a desired horizontal position and a desired vertical position relative to a runway.

Embodiment 14: The landing assistance system of Embodiment 13, wherein the at least one autonomous aircraft is configured to transmit the signals produced from the runway.

Embodiment 15: The landing assistance system of Embodiment 14, wherein the at least one autonomous aircraft is configured to translate the signals produced from the runway to a format readable by the approaching aircraft.

Embodiment 16: The landing assistance system of any one of Embodiments 13 through 15, wherein the at least one autonomous aircraft is configured to interpret instrument landing system (ILS) signals and transmit raw data from the ILS signals to the approaching aircraft in a format readable by a control system in the approaching aircraft.

Embodiment 17: The landing assistance system of Embodiment 16, wherein the at least one autonomous aircraft comprises an image projection system configured to project an image in front of a pilot of the approaching aircraft.

Embodiment 18: The landing assistance system of Embodiment 17, wherein the at least one autonomous aircraft is configured to project a guideline corresponding to a recommended approach path generated by the ILS signals.

Embodiment 19: The landing assistance system of any one of Embodiments 13 through 17, wherein the at least one autonomous aircraft is configured generate information similar to a ground based ILS system.

Embodiment 20: The landing assistance system of Embodiment 19, wherein the at least one autonomous aircraft is configured to transmit the generated information to a device in the approaching aircraft configured to display the generated information.

Embodiment 21: A flight assistance system comprising: an autonomous aircraft configured to fly at a speed and altitude similar to an associated aircraft; at least one non-transitory computer-readable storage medium storing instructions thereon that, when executed by at least one processor, cause the autonomous aircraft to: receive data from the associated aircraft; receive atmospheric data from one or more atmospheric sensors; calculate an optimal position of the autonomous aircraft relative to the associated aircraft to minimize drag on the associated aircraft; and transmit the optimal position to one or more of the autonomous aircraft and the associated aircraft.

Embodiment 22: The flight assistance system of Embodiment 21, wherein the instructions of the autonomous aircraft, when executed by the at least one processor, cause the autonomous aircraft to calculate the optimal position of the autonomous aircraft relative to the associated aircraft to induce ground effect on the associated aircraft.

Embodiment 23: The flight assistance system of Embodiment 22, wherein the associated aircraft comprises one or more wings defining a wingspan and the optimal position of the autonomous aircraft is a distance below the one or more wings equivalent to between about 0.1 wingspan and about 1 wingspan.

The embodiments of the present disclosure may provide decreases in fuel consumption of aircraft as well as significant efficiency upgrades. Autonomous companion aircraft may increase the fuel efficiency of an aircraft during flight. Additionally, autonomous companion aircraft may traverse technological barriers between less sophisticated aircraft and modern airports. The autonomous companion aircraft may allow less sophisticated aircraft to take advantage of additional safety measures, flying aids, landing aids, visibility enhancing technology, etc. Autonomous aircraft may also be used to assist damaged or malfunctioning aircraft to a safe landing.

The embodiments of the present disclosure may also provide improved interactions between runways and approaching aircraft. Autonomous intercepting aircraft may allow less sophisticated aircraft to take advantage of ILS or pseudo ILS systems. Autonomous intercepting aircraft may also allow runways that are not equipped with ILS systems to provide a similar benefit to approaching aircraft without the expense of installing an ILS system. Autonomous intercepting aircraft may increase the safety for approaching aircraft, provide a more efficient landing assistance system, allow aircraft to land in lower visibility conditions, and provide improved interaction between pilots and the runway.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An aircraft assistance method comprising:
   flying an autonomous aircraft in an area preceding an aircraft;
   determining an optimal position for the autonomous aircraft relative to the aircraft such that vortices created by the autonomous aircraft interact with the aircraft to reduce drag on the aircraft;
   adjusting the optimal position through a feedback loop that compares one or more of thrust, air resistance and drag from the aircraft; and
   positioning the autonomous aircraft in the optimal position.

2. The method of claim 1, wherein the autonomous aircraft is not remotely controlled.

3. The method of claim 1, further comprising determining a position and a magnitude of the vortices is with image data from a heat camera.

4. The method of claim 1, further comprising determining the optimal position with a modeling algorithm.

5. The method of claim 1, wherein the feedback loop compares a drag measurement from the aircraft.

6. The method of claim 1, further comprising positioning a plurality of autonomous aircraft in independently optimal positions such that the vortices of each of the plurality of autonomous aircraft interact with the aircraft.

7. The method of claim 1, further comprising providing the optimal position to the aircraft.

8. The method of claim 7, wherein providing the optimal position to the aircraft comprises displaying a visual representation of the optimal position.

9. The method of claim 1, wherein the autonomous aircraft further comprises an impact protection system comprising:
   an electrical power source;
   a proximity sensing device configured to produce a signal when a threshold distance between the autonomous aircraft and the aircraft is reached; and
   a compressible container containing the electrical power source configured to crush the electrical power source upon receiving the signal from the proximity sensing device.

10. A flight assistance system comprising:
    an autonomous aircraft configured to fly at a speed and altitude similar to an associated aircraft;
    at least one non-transitory computer-readable storage medium storing instructions thereon that, when executed by at least one processor, cause the autonomous aircraft to:
    receive data from the associated aircraft;
    receive atmospheric data from one or more atmospheric sensors;
    calculate an optimal position of the autonomous aircraft relative to the associated aircraft to minimize drag on the associated aircraft;
    adjust the optimal position through a feedback loop that compares one or more of thrust, air resistance and drag from the aircraft; and
    transmit the optimal position to one or more of the autonomous aircraft and the associated aircraft.

11. The flight assistance system of claim 10, wherein the instructions of the autonomous aircraft, when executed by the at least one processor, cause the autonomous aircraft to calculate the optimal position of the autonomous aircraft relative to the associated aircraft to induce ground effect on the associated aircraft.

12. The flight assistance system of claim 11, wherein the associated aircraft comprises one or more wings defining a wingspan and the optimal position of the autonomous aircraft is a distance below the one or more wings equivalent to between about 0.1 wingspan and about 1 wingspan.

* * * * *